(12) United States Patent
Jaeger

(10) Patent No.: US 6,626,586 B1
(45) Date of Patent: Sep. 30, 2003

(54) REMOTELY CONFIGURABLE OPTICAL COMMUNICATION NETWORK

(75) Inventor: Hubert Jaeger, Pullach (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/528,231

(22) Filed: Mar. 17, 2000

(30) Foreign Application Priority Data

Mar. 17, 1999 (DE) ............................. 199 11 957

(51) Int. Cl.[7] .................................................. G02F 1/00
(52) U.S. Cl. ................................. 398/5; 398/61; 398/63
(58) Field of Search ................................ 359/110, 119, 359/121–122, 127–128

(56) References Cited

U.S. PATENT DOCUMENTS 6,295,146 B1 * 9/2001 Nathan et al. .............. 359/119

* cited by examiner

Primary Examiner—Kinfe-Michael Negash
(74) Attorney, Agent, or Firm—Bell, Boyd & Lloyd LLC

(57) ABSTRACT

In a communication network, a logical connections is realized by defined connection paths, with each connection containing at least one connection segment path, whereby a working connection path routed by a "star point" network node and a geographically different substitute connection path routed by another "star point" network node are provided for each connection. In addition, through-switching means are provided in the "star point" network nodes for the switching through of the connections, respectively, by the working connection path and the substitute connection path.

10 Claims, 3 Drawing Sheets

|      | NK1 | NK2 | NK3 | NK4 |
|------|-----|-----|-----|-----|
| NK1  | 1   | 1   | 0   | 0   |
| NK2  | 1   | 1   | 0   | 0   |
| NK3  | 0   | 0   | 1   | 1   |
| NK4  | 0   | 0   | 1   | 1   |

REMOTELY CONFIGURABLE OPTICAL COMMUNICATION NETWORK

BACKGROUND OF THE INVENTION

In purely optical communication networks, in particular with WDM (wavelength division multiplexing) communication networks, data transmission channels having various wavelengths are used to produce data connections. As desired by the network customer, network operators are supposed to provide optical logical connections, for example short-term ones, between arbitrary terminal points within the communication network. Thus, a portion of the optical connections existing in an optical communication network has a static characteristic and another portion has only a brief life span. For the production of short-lived optical connections of this sort, up to now, cross-connectors or through-switching means, operating electronically, have been used, wherein, in particular in the future for the exploitation of the existing network capacities, optical through-switching means, also called add-drop multiplexers, which can be remotely configured automatically, are provided in the respective concentration points of the communication network. However, the use of these remotely configurable optical through-switching means is very cost-intensive and requires a high maintenance expense.

In addition, in the design of the optical forward/return connection in optical communication networks, for reasons of security of the communication network, care is taken that the optical forward/return connection and the corresponding optical "protection" forward/return connections are set up in different optical fibers that are routed via geographical connection paths that run in spatially separated fashion. In this way, in the case of a break in a fiber, it is ensured that a reliable substitute connection is available for the data transmission.

In particular, individual network customers request that, in communication networks having a double-star topology, optical forward/return connections that are provided only for a short time period, and the additional optical protection forward/return connections, can be set up or, respectively, dismantled automatically and from a control point that is remote from the point of connection.

In known optical communication architectures, for this purpose, through-switching means that can be remotely configured are provided both at the two "star-point" network nodes and also at additional network nodes of the optical communication network. Thus, the network nodes are connected to concentration points located between the individual geographical connection paths. Due to the large number of these remotely configurable through-switching means provided at the network nodes, there results a high degree of complexity of the optical communication network, which contributes, in particular, to an increased production expense and a lower degree of reliability of the communication network. In addition, given an optically transparent realization of the communication network, an optical power control unit is to be provided in addition to the remotely configurable through-switching means for the matching of the power of the optical signal received in the respective network node. This also leads to an increase in the complexity of the overall system and to a considerable increase in the production expense for the optical remotely configurable communication network.

SUMMARY OF THE INVENTION

An underlying object of the present invention is to construct a remotely configurable optical communication network in such a way that remotely configurable through-switching means are to be provided only at the two "star point" network nodes of the communication network in order to ensure, for all logical connections planned in the network and provided between the individual network nodes, at least two logical connection paths that run in a geographically separated fashion. The object is achieved on the basis of a remotely configurable optical communication network having at least two "star point" network nodes and having a plurality of network nodes connected respectively to the at least two "star point" network nodes via logical connections, each logical connection being realized by defined connection paths with each path containing at least one connection path segment, each logical connection having a working connection path routed via a "star point" network node and a geographically different substitute connection path, routed via the additional "star point" network node, the "star point" network nodes being provided with optical through-switching means for switching through the logical connection via the working connection path and the substitute connection path between the respective network nodes.

The essential aspect of the inventive remotely configurable optical communication network is that the remotely configurable optical communication network, which has at least two "star point" network nodes and a plurality of network nodes connected, respectively, via logical connections to the at least two "star point" network nodes. The logical connections are realized by defined connection paths that contain at least one connection path segment. In addition, for each logical connection, a working connection path, routed via a "star point" network node, and a geographically different substitute connection path, which is routed via an additional "star point" network node, are realized, and the optical through-switching means are provided in each of the "star point" network nodes for switching through the logical connections, respectively, via the working connection path and the substitute connection path between the respective network nodes. Advantageously, for each existing or planned logical connection between two network nodes, a working connection path that is provided for an active connection fiber and a substitute connection path, that is routed in a different geographical fashion and is provided for a redundant connection fiber, are respectively used for the transmission of the optical signals, whereby the working connection path provided for the active connection fiber is routed via a first "star point" network node, and the substitute connection path provided for the redundant connection fiber is routed via a second "star point" network node. An allocation of this sort of the connection paths provided for active and redundant data transmission and the connection of each network node with one of the "star point" network nodes via logical connections makes it possible, with the aid of optical remotely configurable through-switching means connected in the "star point" network nodes, to reconfigure the connection paths provided for the forward/return connections in the "star point" network node or to switch through connection paths or separate them. In this way, no remotely configurable through-switching means are required in the respective network nodes in order to connect the individual network nodes of the optical communication network with another according to their logical connections in such a way that the two connection paths that run spatially separate from one another are respectively provided for the active and for the redundant data transmission. In addition, the cost-intensive preparation of optical power control units in the individual network nodes can be omitted, and there advantageously results a reduction in the complexity of the communication network, due to the more advantageous configuration of the communication network. In addition, connection paths standardly consist of a plurality of connection path segments, often called "ducts" by those skilled in the art. "Ducts" are to be understood as shafts in which optical fibers are routed from an optical add-drop multiplexer to another optical add-drop multiplexer. In the inventive remotely configurable optical communication network, a multiple use of a duct for the working connection path and for the substitute connection path is avoided, and by this means the failure of the logical connection in case of an optical fiber breakage is avoided.

The inventive remotely configurable optical communication network thus presents a communication network that is optimized with respect to the exploitation of the existing or planned connection paths, in which, without the aid of additional remotely configured through-switching means provided in the individual network nodes, an extremely flexible switching through of short-term connections with a 1+1 power protection, becomes possible via two connection paths routed in spatially separate fashion.

According to a further construction of the inventive remotely configurable optical communication network, a computing unit or means is provided for the formation of an item of data traffic relation information, representing the expected data traffic relation between the individual network nodes, and for the calculation of the working connection paths routed via the "star point" network nodes. In addition, the computing unit or means is provided for the calculation of the geographically various substitute connection paths that are routed via the additional "star point" network nodes, and for the formation of an item of connection path information. Advantageously the data traffic relation information required for the planning of the inventive remotely configurable optical communication network is formed in the computing unit in the form of a correlation matrix, whereby the elements thereof define unambiguously those network nodes located in the communication network between which a logical connection is planned, and the network nodes among which no logical connection is provided. In addition, the working connection paths and the substitute connection paths provided for the planned logical connections between the network nodes are calculated in the computing unit and an item of the connection path information is formed therefrom. The items of information calculated in the computing unit are used for the optimal configuration of the inventive optical communication network with respect to the optimal exploitation of the existing connection path resources.

Additional advantageous constructions of the invention can be seen from the following description of the preferred embodiments, the drawings and claims.

DESCRIPTION OF THE PREFERRED EMBODIMENTS

Figures 1, 3:
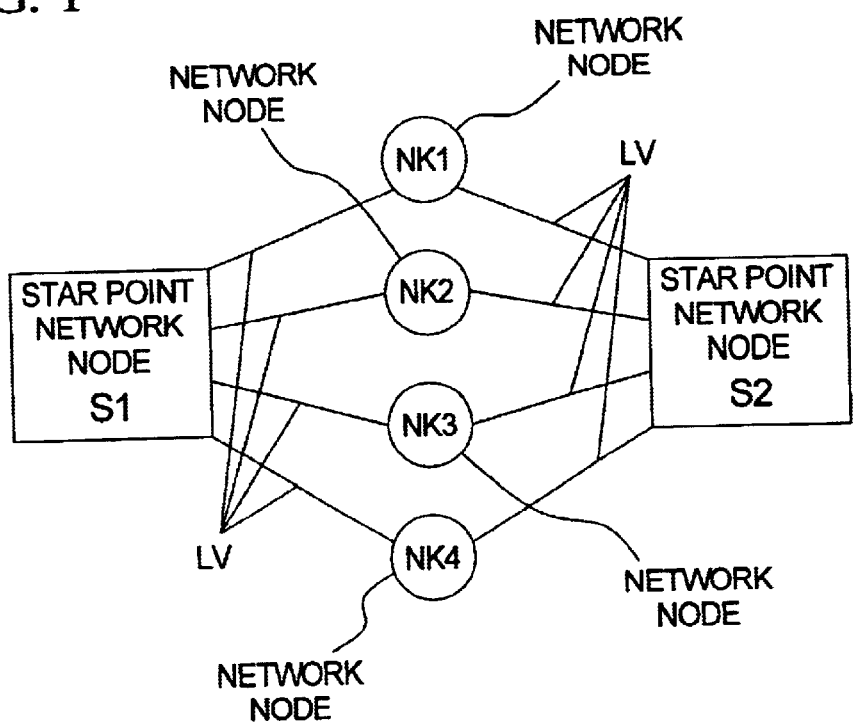
FIG. 1 shows, in a schematic switching diagram, the logical structure of the remotely configurable optical communication network.
FIG. 3 shows, in a table, the correlation matrix representing the planned traffic relations.

The principles of the present invention are particularly useful when incorporated in a logical structure that forms a basis of the remotely configurable optical communication network FOK shown in FIG. 1. For this purpose, as examples, a first, a second, a third and a fourth network node NK1, NK2, NK3 and NK4 of a multiplicity of possible network nodes are shown, wherein each of the four network nodes NK1–NK4 represent a part of an optical communication means (not shown in FIG. 1) of a network customer. The first, second, third and fourth network nodes are connected respectively via logical connection LV, with a first and a second "star point" network node S1 and S2, whereby no optical communication means of network customers are connected directly to the first and second "star point" network nodes S1 and S2. The depicted local connections are intended as examples and permit no conclusion concerning the actual course of the optical fibers in the remotely configurable optical communication network FOK.

Figure 2:
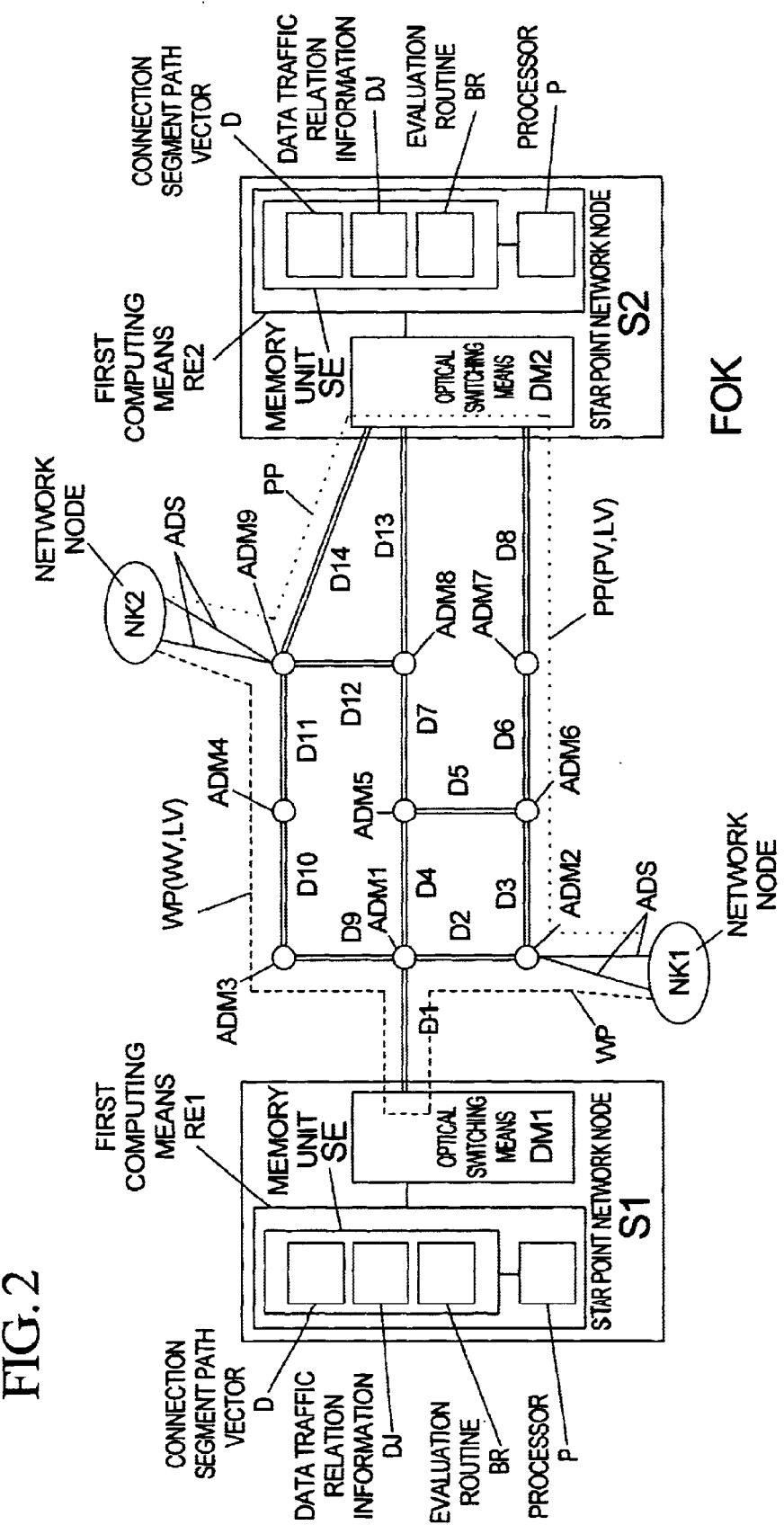
FIG. 2 shows, in a schematic switching diagram, the remotely configurable optical communication network.

FIG. 2 schematically shows the construction of a remotely configurable optical communication network FOK. Analogous to FIG. 1, the first and second "star point" network nodes S1 and S2 and the first and second network nodes NK1 and NK2 are shown, whereby, in addition, a first, second, third, fourth, fifth, sixth, seventh, eighth and ninth add-drop multiplexers ADM1–ADM9 for the connection of network nodes NK1–NK4 to the remotely configurable optical communication network FOK, are provided. In other embodiments of the inventive remotely configurable communication network FOK, it is also realized, for example, that both the first and the second "star point" network nodes S1 and S2 are provided at the same geographical location or in a common building. As an example, in FIG. 2, the first network node NK1 is connected to an optical add-drop multiplexer ADM2 via optical add-drop terminals ADS, wherein the second network node NK2 is connected to a ninth add-drop multiplexer ADM9 by optical add-drop terminals ADS. The connection of the first and the second network nodes NK1 and NK2 to the remotely configurable optical communication network FOK can also take place via two add-drop terminals ADS to two different add-drop multiplexers ADM1–ADM9. For example, the first network node NK1 can be connected via add-drop terminals ADS with the second add-drop multiplexer ADM2 and with an additional redundant add-drop terminal ADS with the sixth add-drop multiplexer ADM6. In this way, what is called a "dual homing" protection for the connection of the network nodes NK1–NK4 of the network customer is enabled. For the geographical routing of the optical fibers (not shown explicitly in FIG. 2 for reasons of clarity), a first, second, third, fourth, fifth, sixth, seventh, eighth, ninth, tenth, eleventh, twelfth, thirteenth, and fourteenth line duct or, respectively connection path segments D1–D14 are provided, in which, for example, all the optical fibers of the remotely configurable optical communication network FOK can be laid. The number of connection path segments D1–D14 is kept low in FIG. 2 for reasons of clarity and is significantly larger in practically realized optical communication networks FOK.

An individual connection path segment D1–D14 is preferably located between the individual add-drop multiplexers ADM1–ADM9, whereby the first connection path segment D1 is located between the first "star point" network node S1 and the first add-drop multiplexer ADM1; the second communication path segment D2 is located between the first and second add-drop multiplexers ADM1 and ADM2; the ninth connection path segment D9 is located between the first and third add-drop multiplexers ADM1 and ADM3 and the fourth connection path segment D4 is located between the first and fifth add-drop multiplexers ADM1 and ADM5. In addition, the third connection path segment D3 interconnects the second and the sixth add-drop multiplexers ADM2 and ADM6; the fifth connection path segment D5 interconnects the fifth and sixth add-drop multiplexers ADM5 and ADM6 and the sixth connection path segment D6 is provided to interconnect the sixth and seventh add-drop multiplexers ADM6 and ADM7. The seventh add-drop multiplexer ADM7 is connected with the second "star point" network node S2 via the eighth connection path segment D8 and the eighth add-drop multiplexer ADM8 is connected with the second "star point" network node S2 via the thirteenth connection path segment D13, while the ninth add-drop multiplexer ADM9 is connected with the second "star point" network node S2 via the fourteenth connection path segment D14. In addition, the tenth connection path segment D10 is provided between the third and fourth add-drop multiplexers ADM3 and ADM4; the eleventh connection path segment D11 interconnects the fourth and ninth add-drop multiplexers ADM4 and ADM9 while the seventh connection path segment D7 interconnects the fifth and eighth add-drop multiplexers ADM5 and ADM8. Finally, the twelfth connection path segment D12 is provided between the eighth and ninth add-drop multiplexers ADM8 and ADM9.

In the first "star point" network node S1, a first optical through-switching means DM1 is provided for the switching through of logical connections LV via connection paths WP, and the first optical switching means DM1 is connected with a first computing unit or means RE1. In an analogous way, the second "star point" network node S2 has a second optical through-switching means DM2 which is provided for switching through logical connections LV via the connection paths WP, PP to which second means a second computing unit or means RE2 is connected.

In the inventive remotely configurable optical communication network FOK, for example, a logical connection LV is set up between the first and the second network nodes NK1 and NK2 via four connection paths WP and PP that are routed via different connection path segments D1–D14. For this purpose, a logical working connection WV is set up by each working connection path WP and a logical "protection" connection PV is set up by each substitute connection path PP, whereby each logical working connection WV is switched through with the aid of the first optical through-switching means DM1 of the first "star point" network node S1, and each logical protection connection PV is switched through with the aid of the second optical through-switching means DM2 of the second "star point" network node S2. The working connection paths WP, which are shown in broken lines, are formed from the second, first, ninth, tenth and eleventh connection path segments D2, D1, D9, D10 and D11, wherein the logical working connection WV for the first network node NK1 is thus also routed via the first and second add-drop multiplexers ADM1 and ADM2. The working connection WV for the second network node NK2 is routed via the first, third and fourth add-drop multiplexers ADM1, ADM3 and ADM4. The first connection path segment DI is connected with the first optical through-switching means DM1 of the first "star point" network node S1 and is multiply used as part of the two working connection paths WP. In contrast to this, the substitute connection path PP, which is shown in dotted lines, is formed from the third, sixth, eighth and fourteenth connection path segments D3, D6, D8 and D14 and runs via the second, sixth and seventh add-drop multiplexers ADM2, ADM6 and ADM7 to the network node NK1 and by the ninth add-drop multiplexer ADM9 to the network node NK2, with the eighth and fourteenth connection path segments D8 and D14 being connected to the second optical through-switching means DM2 of the second "star point" network node S2.

In addition, the first computing unit or means RE1 of the first "star point" network node S1 is operated in an active operating mode, and the second computing unit or means RE2 of the second "star point" network node S2 is operated in a redundant operating mode, i.e., if a disturbance of the operation of the first computing unit RE1 occurs, a changeover to the second computing unit RE2 takes place. The manner of functioning of the first computing unit RE1 is explained in more detail below and the second computing unit RE2 has an analogous design and an analogous manner of operation. The integrated arrangement shown in FIG. 2 of the first and second computing units or means RE1 and RE2 in the first or, respectively, second "star point" network nodes S1 and S2 is given only as an example. The first and second computing means RE1 and RE2 could also be provided at a location selected independently of the remotely configurable optical communication network FOK. Below, the first and second optical through-switching means are remotely configurable; for example, they can be controlled from a geographically remote location. In the case shown in FIG. 2, the first and second optical through-switching means DM1 and DM2 are remotely controlled or, respectively, remotely configured by the first computing means RE1 via the remotely configurable optical communication network FOK. For the determination of the items of information required for the switching through of the individual logical connections LV, an evaluation routine BR, stored in a memory unit SE, is provided in the first computing means RE1. The second computing means RE2 has an analogous construction. In addition, an item of data traffic relation information DJ, formed in the first computing means, is stored in the memory unit SE in the form of a correlation matrix KM (see FIG. 3) and a connection segment path vector D. With the aid of the correlation matrix KM, the traffic relation for this remotely configurable optical communication network FOK that are expected between the connection communication devices of the network customers, for example the first, second third and fourth network nodes NK1–NK4, are acquired. The connection path segment vector D contains as elements the individual connection path segments D1–D14 that are available for the determination of connection paths WP and PP inside the remotely configurable optical communication network FOK, whereby the connection path segment vector D for the optical communication network shown in FIG. 2 results, for example, as $D=(D1, D2, D3, D4, D5, D6, D7, D8, D9, D10, D11, D12, D13, D14)^T$.

FIG. 3, which is illustrated as a table, shows one of a multiplicity of possible correlation matrices KM representing the planned traffic relation or logical connections LV between the network customers connected to the first, second, third and fourth network nodes NK1–NK4. The correlation matrix KM consists of network nodes NK1–NK4 connected to the optical communication network FOK, whereby a column and a row of the correlation matrix KM is respectively provided for each network node NK1–NK4. Here, for example, the element $a_{14}$ of the correlation matrix KM arranged in the first column and in the fourth row and having a binary value "0" expresses that no logical connection LV or no data traffic relation is planned between the first and fourth network nodes NK1 and NK4. In contrast, the element $a_{12}$ of the correlation matrix KM located in the first column and in the second row and having a binary value "1" indicates that a logical connection LV or a traffic relation is provided between the first and second network nodes NK1 and NK2. Due to the symmetrical structure of the correlation matrix KM, the elements $a_{11}$, $a_{22}$, $a_{33}$ and $a_{44}$, located on the main diagonal of the correlation matrix KM, have a binary value "1" and are not taken into account below in the later evaluation of the correlation matrix KM by the evaluation routine BR. The correlation matrix KM shown in FIG. 3 shows a logical connection between the first and second network nodes NK1 and NK2 and between the third and fourth network nodes NK3 and NK4 of the network customer.

The data traffic relation information DJ, present in the form of the correlation matrix KM shown in FIG. 3, and the connection path segment vector D are read out from the memory unit SE in the execution of the evaluation routine BR by a processor P provided in the first computing means RE1, wherein the processor P is connected to the memory unit SE. In addition, for the determination of the working connection paths WP that are routed via the first "star point" network node S1, and of the substitute connection paths PP routed via the second "star point" network node S2, for the respective logical connections LV, the evaluation routine BR is read out from the memory unit SE by the processor P and is executed, whereby, in addition, with the aid of the evaluation routine BR, items of connection path information are formed on the basis of which the switching through of the logical connections LV is carried out by means of the optical remotely configured first and second optical through-switching means DM1 and DM2.

Figure 4:
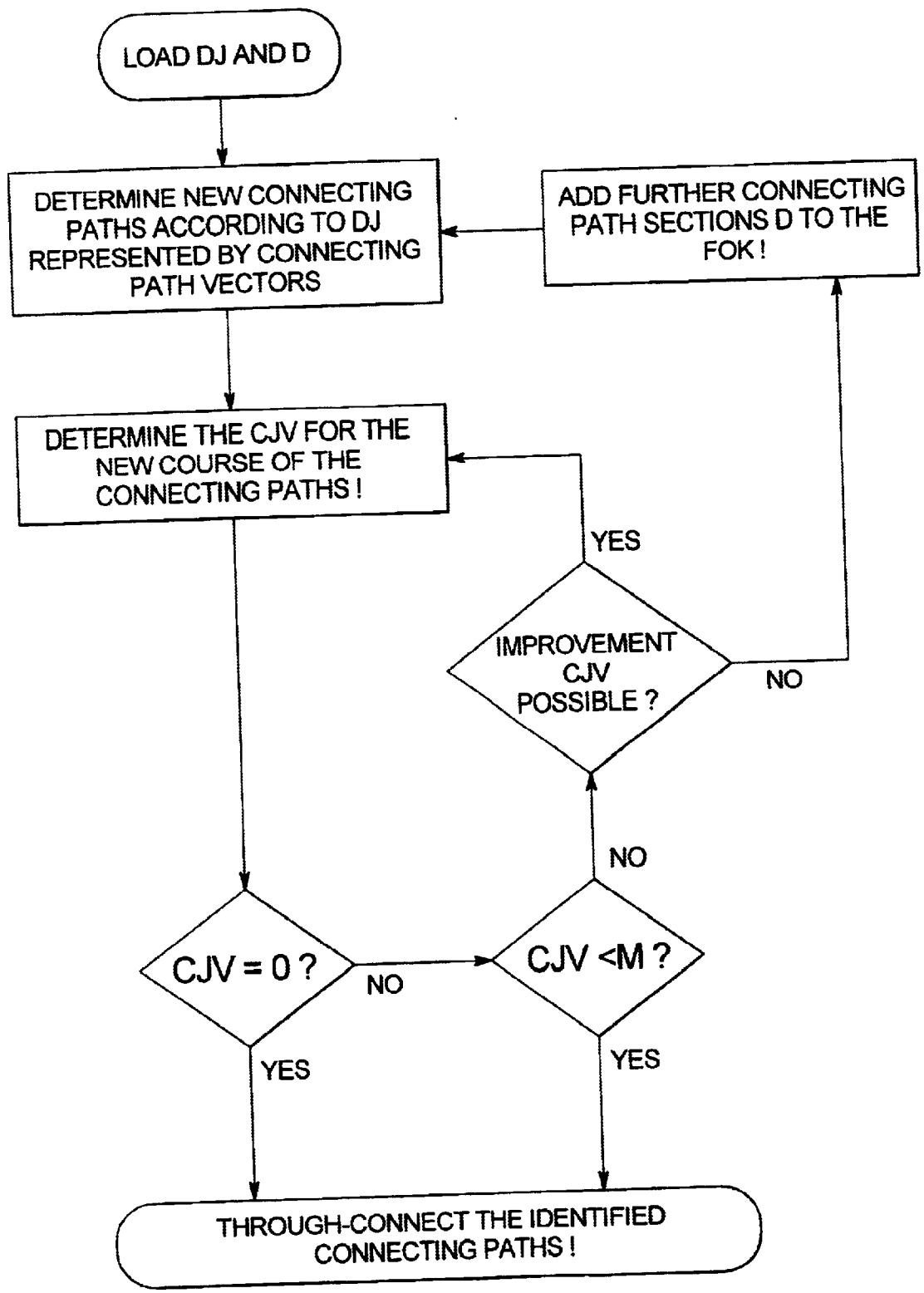
FIG. 4 shows a flow diagram of the evaluation routine executed in the computing unit or means.

In FIG. 4, the evaluation routine BR executed by the processor P is shown in principal in a flow diagram. First, the processor P reads the data traffic relation information DJ and the connection path segment vector D out from the memory unit SE and subsequently forms possible connection path vectors $V_{ij}$, whereby the sequence and the number of available connection path segments D1–D14 is defined by the connection path segment vector D. In addition, the connection path vector $V_{ij}$, for example each working connection path WP shown in broken lines in FIG. 2, is respectively formed from two connection paths that run from the respective network node NK1, NK2 to the "star point" network nodes S1 and S2. For example, a first connection path vector $DUV_{1,S1}$ is formed between the first network node NK1 and the first "star point" network node S1, and a second connection path vector $DUV_{2,S1}$ is formed between the first "star point" network node S1 and the second network node NK2 and these are subsequently combined to form a common connection path vector $V_{12A}$ according to the following formula implemented in the processor P:

$$V_{ij} = DUV_{i,Sx} + DUV_{j,Sy} \text{ with } i<j; \; i,j \neq 0$$

whereby $DUV_{i,Sx}$ represents the connection path vector for connection paths that connect the "star point" network node Sx and the ith network node, and $DUV_{j,Sy}$ represents the connection path vector for a connection path that connects the "star point" network node Sy and the jth network node.

A possible connection path vector $V_{12A}$ for the working connection path WP shown in broken lines in FIG. 2 thus results as:

$V_{12A} = (1,1,0,0,0,0,0,0,1,1,1,0,0,0)^T$ with
$DUV_{1,S1} = (1,1,0,0,0,0,0,0,0,0,0,0,0,0)^T$ and
$DUV_{2,S1} = (1,0,0,0,0,0,0,0,1,1,1,0,0,0)^T$.

A binary value "1" is allocated to each element of the connection path segment vector D that represents a connection path segment D1, D2, D9, D10, D11 used for the working connection path WP, and a binary value "0" is allocated to the elements that represent an unused connection path segment D3, D4, D5, D6, D7, D8, D12, D13, D14. Analogously, a connection path vector $V_{12P}$ is calculated for the substitute connection path PP that is represented in FIG. 2 by dotted lines. This yields:

$V_{12P} = (0,0,1,0,0,1,0,1,0,0,0,0,0,1)^T$ with
$DUV_{1,S2} = (0,0,1,0,0,1,0,1,0,0,0,0,0,0)^T$ and
$DUV_{2,S2} = (0,0,0,0,0,0,0,0,0,0,0,0,0,1)^T$.

After a working connection path WP and a substitute connection path PP have respectively been calculated in the form of a connection path vector $V_{ij}$ for all planned logical connections LV given by the data traffic relation information DJ, an item of network routing information CJV is additionally formed. For example, the calculation of the network routing information CJV is by the following formula, which is implemented on the processor P:

$$CJV = \sum_{i,j}^{N,N} a_{ij} \cdot (DUV_{i,Sx}) \cdot (DUV_{j,Sy})^T \text{ with } i<j; \; i, j \neq 0$$

whereby CJV represents the network routing information; i represents a first summation variable; j represents a second summation variable; N represents the number of network nodes in the communication network; $a_{ij}$ represents the elements at the ith row and jth column of the correlation matrix KM; $DUV_{i,Sx}$ represents the connection path vector for a connection path that connects the "star point" network node Sx and the ith network node; and $DUV_{j,Sy}$ represents the connection path vector for a connection path that connects the "star point" network node Sy and the jth network node.

The flow diagram of FIG. 4 illustrates that if the value of the network routing information CJV, which indicates the number of connection path segments D1–D14 used in common, both in the working connection paths WP and in the substitute connection paths PP, for all planned logical connection LV within the remotely configurable logical communication network FOK, is evaluated and, if the network routing information CJV has a value "0", all logical connections LV can be set up through the working connection paths WP and the geographically different routing substitute connection paths PP. If the network routing information CJV has a value "0", then the processor P switches through the common path $V_{ij}$, determined on the basis of the connection path vectors $DUV_{i,Sx}$ and $DUV_{j,Sy}$, with the aid of the first and second optical through-switching means DM1 and DM2. If the network routing information CJV assumes a value that is not equal to "0" but is less than a previously defined value "M", which defines a maximum number of commonly used connection path segments D1–D14 for a planned logical connection LV within a remotely configurable logical communication network FOK, then the processor P, in turn, switches through the determined connection paths WP and PP with the aid of the first and second optical through-switching means DM1 and DM2.

If the value of the network routing information CJV exceeds the value "M", it is checked whether an improvement of the network routing information CJV by means of a recalculation of connection path vectors $DUV_{i,Sx}$, $DUV_{j,Sy}$ is still possible. If all possible choices of connection path vectors $DUV_{i,Sx}$ and $DUV_{j,Sy}$ within the available connection path segment vector D are already exhausted, and, therefore, no further improvements of the network routing information CJV are possible, then in a further step, an additional connection path segment is added to the connection path segments D1–D14, which were provided in the planned optical communication network FOK, for example in addition to the connection path segments D1–D14 shown in FIG. 2, a fifteenth connection path segment D15 is added to the connection path segment vector D. Taking into account these new fiber-optical infrastructural properties of the communication network FOK, new connection path vectors $DUV_{i,Sx}$ and $DUV_{j,Sy}$ are again calculated. The evaluation routine is executed until an item of network routing information CJV has been determined that fulfills the conditions shown in FIG. 4, for example network routing information CJV="0" or network routing information CJV<"M".

After the switching through of these connection paths $V_{ij}$, represented by the common connection path vectors, the evaluation routine BR is terminated with the aid of the first and second optical through-switching means DM1 and DM2. The remotely configurable optical communication network FOK configured in this way comprises the determined and configured logical connections LV in unchanged fashion until changes result in the data traffic relations between the respective network nodes NK1–NK4 or until additional network nodes are connected to the remotely configurable optical communication network FOK.

Although various minor modifications may be suggested by those versed in the art, it should be understood that I wish to embody within the scope of the patent granted hereon all such modifications as reasonably and properly come within the scope of my contribution to the art.

I claim:

1. A remotely configurable optical communication network having at least two "star point" network nodes and having a plurality of network nodes connected respectively to the at least two "star point" network nodes via logical connections, each logical connection being realized by a working connection path and a geographically different substitute connection path, each connection path containing at least one connection path segment, the working connection path of each logical connection being routed from one of the at least two "star point" network nodes and the geographically different substitute connection path being routed from the other of said at least two "star point" network nodes, said "star point" network nodes having optical through-switching means for switching through the logical connections, respectively, by the working connection path and the substitute connection path between the respective network nodes.

2. A remotely configurable optical communication network according to claim 1, wherein each of the at least two "star point" network nodes includes a computing means for the formation of an item of data traffic relation information representing the expected data traffic relation between the individual network nodes, for the determination of the working connection paths routed via the "star point" network node, for the determination of the geographically different substitute connection paths routed via the other "star point" network node and for the formation of items of connection path information.

3. A remotely configurable optical communication network according to claim 2, wherein the computing means stores the data traffic relation information in the form of a correlation matrix wherein the logical connection is to be expected between two network nodes, a matrix element having a binary value of "1" is allocated to the logical connection and if no logical connection is to be expected, a matrix element having a binary value of "0" is provided.

4. A remotely configurable optical communication network according to claim 2, wherein a connection path selected from a working connection path and a substitute connection path is routed via a respective "star point" network node and consists of at least one connection path segment is represented by a connection path vector in such a way that the number of elements of the connection path vector is defined by a number of geographically different connection path segments that are available for the configuration of the communication network given a connection path segment contained in the connection path, the elements of the connection path vector being allocated to the respective connection path segment is assigned a binary value of "1" and the element of the connection path vector allocated to the connection path segment not contained in the connection path is assigned a binary value "0".

5. A remotely configurable optical communication network according to claim 4, wherein the computing means, for calculation of the connection path vectors for a logical connection between the ith and the jth network nodes, uses the following formula:

$$V_{ij} = DUV_{i,Sx} + DUV_{j,Sy} \text{ with } i<j;\ i,j\neq 0$$

wherein $DUV_{i,Sx}$ represents the connection path vector for a connection path that connects the "star point" network node Sx and the ith network node and $DUV_{j,Sy}$ represents the connection path vector for a connection path that connects the network node Sy and the jth network node.

6. A remotely configurable optical communication network according to claim 2, wherein the item of connection path information formed in the computing means is realized as a scalar product of the connection path vectors representing the work connection path and the substitute connection path.

7. A remotely configurable optical communication network according to claim 2, wherein the computing means combines all of the individual items of the connection path information of the logical connection between the network nodes to form an item of network routing information, whereby the network routing information indicates the number of connection path segments that are multiply used for the logical connections between the individual network nodes.

8. A remotely configurable optical communication network according to claim 7, wherein the computing means calculates the network routing information utilizing the following formula:

$$CJV = \sum_{i,j}^{N,N} a_{ij} \cdot (DUV_{i,Sx}) \cdot (DUV_{j,Sy})^T \text{ with } i<j;\ i,\ j\neq 0$$

wherein CJV represents a network routing information; i represents a first summation variable; j represents a second summation variable; N represents a number of network nodes in the communication network; $a_{ij}$ represents the element at the ith row and the jth column of a correlation matrix; $DUV_{i,Sx}$ represents the connection path vector for a connection path that connects the "star point" network node Sx and the ith network node; and $DUV_{j,Sy}$ represents the connection path vector for a connection path that connects the network node Sy and the jth network node.

9. A remotely configurable optical communication network according to claim 7, wherein, for the configuration of the optical communication network, in the computing means, a maximum number can be defined for the number which represents the network routing information of connection path segments, which are used multiply for the logical connections between the individual network nodes.

10. A remotely configurable optical communication network according to claim 1, wherein the optical through-switching means are remotely configurable for the switching through of the logical connections.

* * * * *